United States Patent
Balva et al.

(10) Patent No.: US 7,290,008 B2
(45) Date of Patent: Oct. 30, 2007

(54) METHOD TO EXTEND A UNIFORM RESOURCE IDENTIFIER TO ENCODE RESOURCE IDENTIFIERS

(75) Inventors: Alexander Balva, San Bruno, CA (US); Elena Dolgopiatova, San Rafael, CA (US); Andrew Leman, San Rafael, CA (US); Sergey Finkelsteyn, Sunnyvale, CA (US); Alex Leyfer, Palo Alto, CA (US)

(73) Assignee: Exigen Group, San Francisco, CA (US)

( * ) Notice: Subject to any disclaimer, the term of this patent is extended or adjusted under 35 U.S.C. 154(b) by 498 days.

(21) Appl. No.: 10/238,320

(22) Filed: Sep. 10, 2002

(65) Prior Publication Data

US 2003/0182305 A1    Sep. 25, 2003

Related U.S. Application Data

(60) Provisional application No. 60/371,370, filed on Apr. 9, 2002, provisional application No. 60/362,557, filed on Mar. 5, 2002.

(51) Int. Cl.
*G06F 17/00* (2006.01)
(52) U.S. Cl. .................. 707/103 X; 707/3; 707/10; 707/101; 707/102; 707/104.1
(58) Field of Classification Search ............ 709/245, 709/217, 219; 715/854, 781; 235/375; 707/1, 707/3, 10, 101, 102, 103 X, 104.1; 711/118
See application file for complete search history.

(56) References Cited

U.S. PATENT DOCUMENTS

| | | | |
|---|---|---|---|
| 6,192,415 B1 * | 2/2001 | Haverstock et al. ........ | 709/245 |
| 6,366,906 B1 * | 4/2002 | Hoffman ....................... | 707/3 |
| 6,732,148 B1 * | 5/2004 | Estrada et al. ............... | 709/205 |
| 6,748,425 B1 * | 6/2004 | Duffy et al. ................. | 709/217 |
| 6,772,393 B1 * | 8/2004 | Estrada et al. ............... | 715/512 |
| 6,785,769 B1 * | 8/2004 | Jacobs et al. ................ | 711/118 |
| 7,114,128 B2 * | 9/2006 | Koppolu et al. ............. | 715/781 |
| 2002/0010798 A1 * | 1/2002 | Ben-Shaul et al. .......... | 709/247 |
| 2002/0104023 A1 * | 8/2002 | Hewett et al. ............... | 713/201 |
| 2002/0198999 A1 * | 12/2002 | Smith et al. ................. | 709/227 |
| 2003/0061515 A1 * | 3/2003 | Kindberg et al. ........... | 713/201 |
| 2003/0131073 A1 * | 7/2003 | Lucovsky et al. ........... | 709/219 |
| 2003/0140115 A1 * | 7/2003 | Mehra ......................... | 709/217 |
| 2003/0191812 A1 * | 10/2003 | Agarwalla et al. .......... | 709/217 |

* cited by examiner

*Primary Examiner*—Thuy Pardo
(74) *Attorney, Agent, or Firm*—Greenberg Traurig, LLP (57) ABSTRACT

Methods and extended URI (Uniform Resource Identifier) schemes for advanced web applications. In one aspect, the extended URI scheme enables an application to employ multiple resources to service a request, wherein parameters corresponding to each of the resources may be passed via a URI string from a client to an application used to service the client. In accordance with other aspects, the extended URI scheme achieves (a) natural external reference-ability of internal application resources, eliminating the need for intermediate mapping, (b) separation of functional and data navigation states, and (c) separation of parameters of individual resources involved in request processing, de-risking name conflicts and increasing usability.

20 Claims, 6 Drawing Sheets http://host/root(Param1, Param2)/B(Param3)/BB(Param4)/?BBA/(Param5)/&BBB(Param6)

FIG. 4 http://host/vroot(params)/a(params)/aa(params)/aab(params);/
aac(params);;;/b(params)/bb(params)/bba(params);

FIG. 5 http://host/Root/B/BB/ ?Param1 & Param2

PATH PART      QUERY PART

FIG. 7A (PRIOR ART)

http://host/root(Param1, Param2)/B(Param3)/BB(Param4)/?BBA/(Param5)/&BBB(Param6)

FIG. 7B http://Root/A(Param1)/AA(Param2)/AAB(Param3):/AAC(Param4):::/B/BB/BBA

METHOD TO EXTEND A UNIFORM RESOURCE IDENTIFIER TO ENCODE RESOURCE IDENTIFIERS

CLAIM OF PRIORITY

This application is related to, and hereby claims the benefit of the filing dates under 35 U.S.C. §119(e) of a co-pending provisional application number 60/362,557, which was filed Mar. 5, 2002 and a co-pending provisional application number 60/371,3780, which was filed Apr. 9, 2002.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Exigen Group All Rights Reserved.

FIELD

The invention generally relates to Web-based application, and in particular, to techniques that support independent functional and data navigation states and for deploying an HTTP URL resource identification technique that externalizes an application navigation state.

BACKGROUND

In today's Web-oriented enterprise software, a standard programming model uses Uniform Resource Locators (URLs) as a means of resource identification on the Internet and also on intranets. The URL specifications cover resource identification mechanisms, such as HTTP, FTP, MAILTO, etc., known as uniform resource locator (URL) schemas.

In a typical system with a set of resources, each individual resource can be identified by a corresponding URL. Accordingly, the navigation state of the system may be identified by the specific resource being invoked at a specific moment, together with its invocation parameters. Indeed, in the field of Web-enabled applications, the only state the client carries is the navigation state expressed in the form of the URL.

There are two principal navigation states: functional and data. The functional navigation state defines what function (screen) of the application is currently engaged, while the data navigation state defines what data unit (record) of a particular data unit (record) type is being worked on. (See also below, FIG. 7a.)

Traditionally, the client state is a node of the application resource tree. This setup is natively supported by the URL structure, which includes the path to a required node in the resource tree. Such a scheme works perfectly well for applications with isolated, atomic resources. However, for applications that need to expose non-atomic resources, or where exposable resources inter-depend, traditional resource identification becomes an issue.

What is clearly needed is a method and system that allows avoidance of these issues by allowing, from the Application Server point of view, which is the abstract of an application, independent functional and data navigation states. In cases where there are dependencies between the functional and data states (for example, a certain record cannot be shown on a particular screen), such dependencies need to be dealt with on the application level. What is clearly further needed is a method and system for deploying the HTTP URL resource identification technique in a manner that enables the application navigation state to be externalized.

Traditionally, in the web-enabled application world, eXtensible Style Sheet (XSL) transformation is used to facilitate creation of presentations in the form of HTML, based on business data provided in the form of XML, and presentation templates, provided in the form of XSL. For instance, to create a page that displays a list of customers, an XML tag <customers> and its content is translated into HTML tag <table>; XML tag <customer> is translated into HTML tag <tr>, and so on, based on XLS transformation instructions contained in an XSL style sheet. The shortcoming of this approach is that for a different page, displaying a list of orders, the XSL transformation instructions need to be different.

What is clearly further needed is a method and system for a two-phase XSL transformation approach that allows an intermediate step for filling in context-related (for example, customer) data for a specific case, thus simplifying and speeding up the XSL process for situations in which multiple XSL style sheets are employed, such as in customer interaction systems.

SUMMARY

Methods and extended URI (Uniform Resource Identifier) schemes for advanced web applications are disclosed. In one aspect, the extended URI scheme enables an application to employ multiple resources to service a request, wherein parameter corresponding to each of the resources may be passed via a URI string from a client to an application used to service the client. In accordance with other aspects, the extended URI scheme achieves (a) natural external reference-ability of internal application resources, eliminating the need for intermediate mapping, (b) separation of functional and data navigation states, and (c) separation of parameters of individual resources involved in request processing, de-risking name conflicts and increasing usability.

Other features and advantages of the present invention will be apparent from the accompanying drawings, and from the detailed description, that follows below.

BRIEF DESCRIPTION OF THE DRAWINGS

Embodiments of the present invention are illustrated by way of example, and not limitation, by the figures of the accompanying drawings in which like references indicate similar elements and in which.

DETAILED DESCRIPTION

In the following detailed description of exemplary embodiments of the present invention, numerous specific details are set forth in order to provide a thorough understanding of the described embodiments of the present invention. However, it will be apparent to one skilled in the art that alternative embodiments of the present invention may be practiced without these specific details. In some instances, well-known structures and devices are shown in block diagram form, rather than in detail, in order to avoid obscuring the description of exemplary embodiments of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

URIs

Uniform Resource Identifiers (URIs) are compact strings of characters for identifying abstract or physical resources. URI syntax and semantics have been derived from the concepts of resource identification used in the Internet and, in particular, web technologies since the beginning of 1990. The URI specification (RFC 2396) generalizes multiple resource identification mechanisms, such as HTTP, FTP, MAILTO, etc., known as universal resource locator (URL) schemas.

Usually, the complexity of business applications requires such applications to expose non-atomic, inter-dependent resources. This is one of the reasons why complex applications seldom deploy the standard HTTP URL resource identification technique. Relying on the URL resource identification using conventional HTTP URLs requires the introduction of an additional resource identification layer exposed to the application clients, plus a mapping layer to relay externally identifiable, atomic resources to the application's internal non-atomic, inter-dependent resources.

Figure 1:
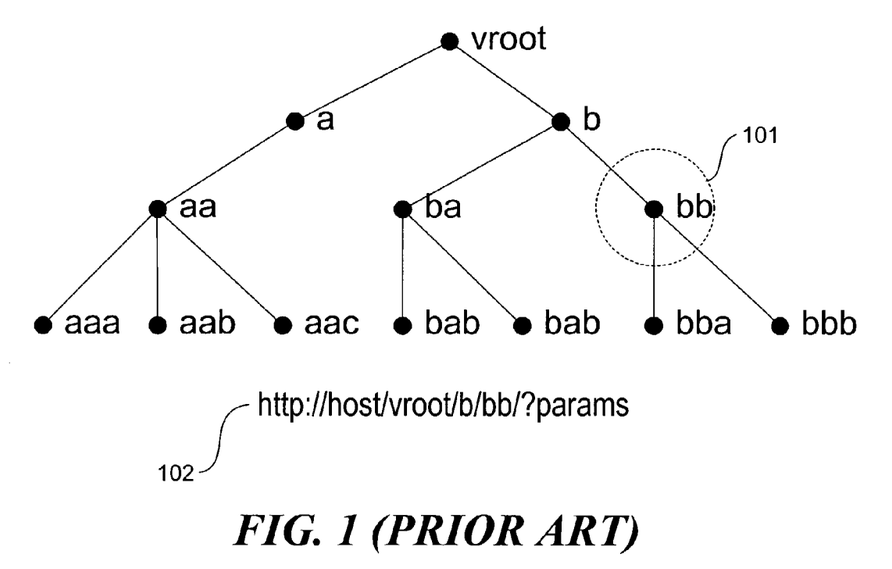
FIG. 1 includes is a diagram of an exemplary resource tree and a corresponding conventional HTTP URL identifying a current resource in the tree corresponding to both a current client and application navigation state.

An exemplary application resource tree and corresponding conventional HTTP URL 102 is shown in FIG. 1. The traditional approach assumes that the application navigation state is a node of the application resource tree. For example, suppose that the current navigation state of the application corresponds to the node bb 101. Under conventional techniques, node bb 101 also represents the current resource, which is defined by the HTTP URL and also corresponds to a current client navigation state. The resource represented by such a node is fully responsible for serving a request. Additional data, presentations, or other application-specific parameters can be passed to a resource in the query part of conventional HTTP URL 102 by placing such parameters after a question mark ("?") following the portion of the URL that identifies the current resource. This semantic originally devised by the HTTP URL specification is widely adopted in the web development world.

To achieve the ability to externalize the application navigation state, embodiments of the invention deploy a modified HTTP URL resource identification technique. To reduce the complexity related to such an approach by eliminating externally the identifiable resource layer and external-to-internal resource mapping, the embodiments extend the traditional URI and HTTP URL Schema semantics. This extension makes the HTTP URL Schema more appropriate for complex application resource identification, while preserving full syntax compatibility with the HTTP URL Schema specification and its existing and future implementations.

Figure 2:
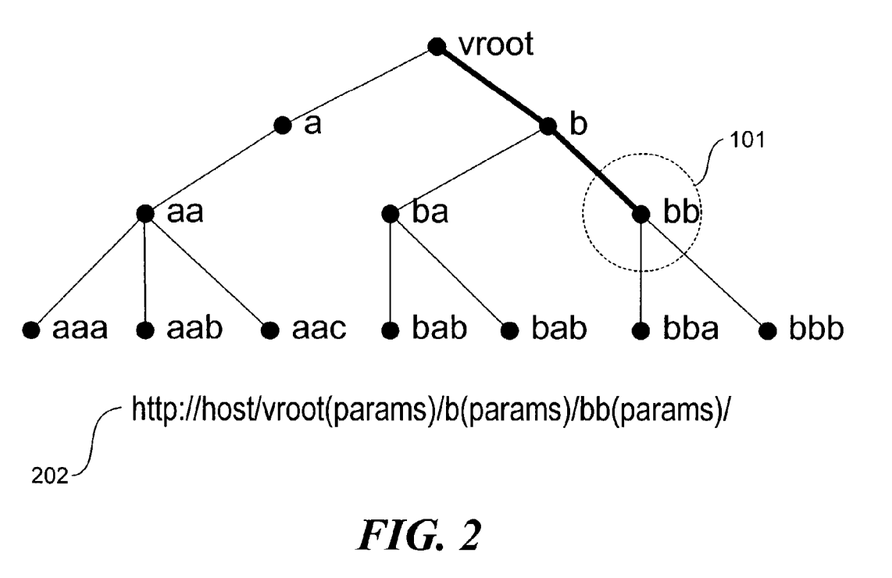
FIG. 2 includes a modified diagram of the resource tree of FIG. 1 and corresponding modified HTTP URL in accordance with an extended URI scheme in accordance with one embodiment of the invention wherein resources along a path from the root of the tree to the current resource may be used to service a request.
Figure 6:
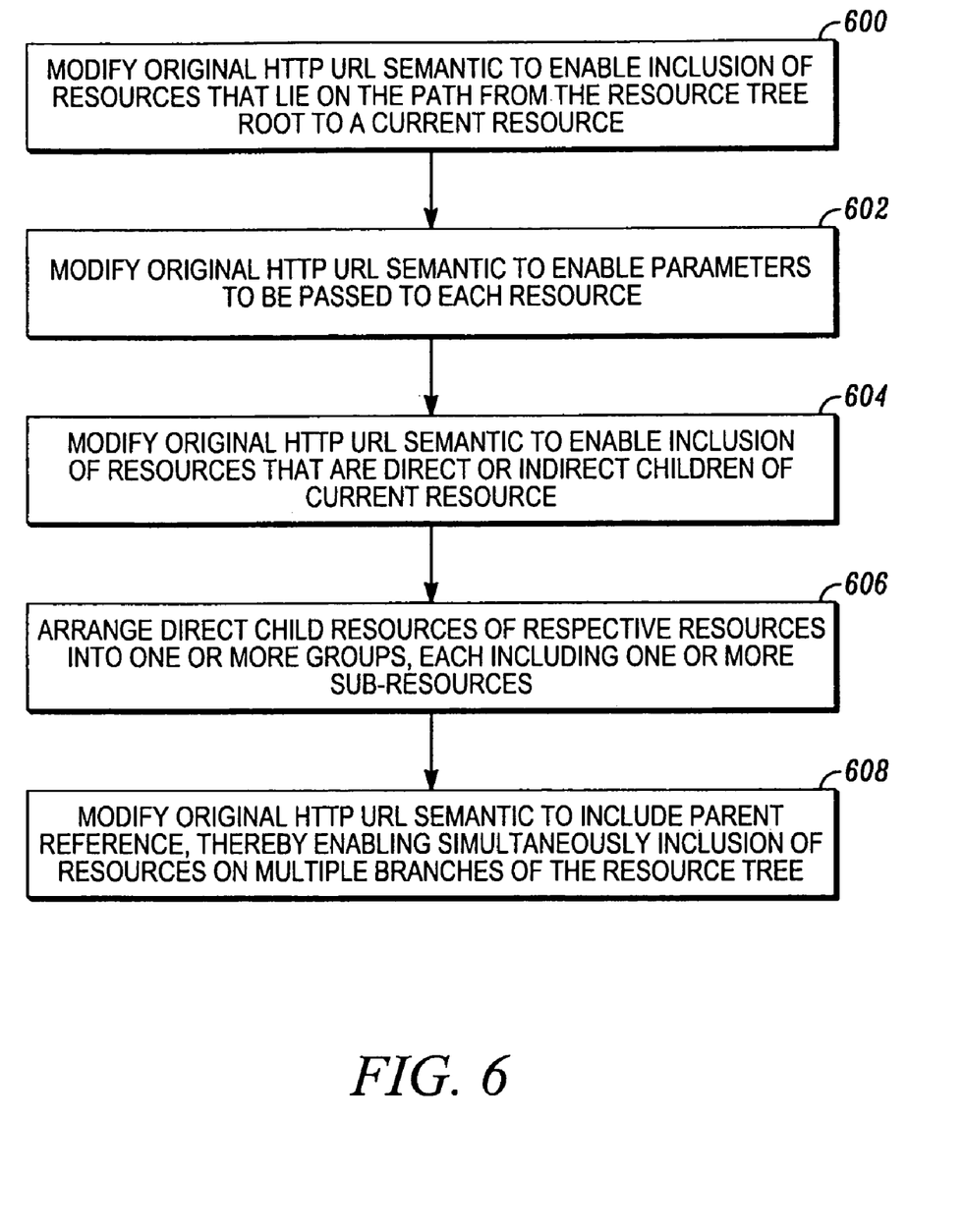
FIG. 6. is a flowchart illustrating modifications made to the original HTTP URL semantic in accordance with the extended URI scheme in accordance with one embodiment of the invention.

With reference to the flowchart of FIG. 6, the first modification to the original HTTP URL semantic is to include the resources that lie on the path from the resource tree root to the selected resource into request processing, as depicted by a block 600. This is graphically depicted in FIG. 2, which modifies the resource tree of FIG. 1 to involve the nodes vroot 204 and b 203, which are on the path to previously selected node bb 101, into the request processing. Thus, three resources—vroot 204, b 203, and bb 101 may be used to server the request.

Aiming for the highest possible degree of independence of individual resources, which ultimately impacts resource reusability, in one embodiment the HTTP URL is modified in a manner that enables each of the resources to be passed individual parameters, as provided by a block 602. Unlike the traditional approach, where only parameters for a single resource may be provided, the embodiment enables multiple parameters to be passed to corresponding resources by embedding those parameters in the URL resource path by placing them in parenthesis (e.g., resource_name(params)) following the resource names in the path, as depicted by a modified HTTP URL 202 shown in FIG. 2. From the HTTP URL specification point of view, the parameters are the part of the resource name, so the addition of the embedded parameters are transparent to applications that employ traditional use of HTTP URL's. In contrast, applications that employ the invention's extended HTTP URL schema recognize the embedded parameters (e.g., by parsing the HTTP URL string for parenthesis pairs), and are thus able to extract the parameters and apply them to appropriate resources.

This extension makes certain assumptions of how the resources are decomposed and arranged into a tree. In particular, it implies that the root resource be used to serve all the application requests (e.g., such a node might be correspond to an application menu) and the nodes on the path serve more than one request. Such decomposition, while requiring certain discipline from the application developer, greatly promotes the reusability of the resources in the application.

Figure 3:
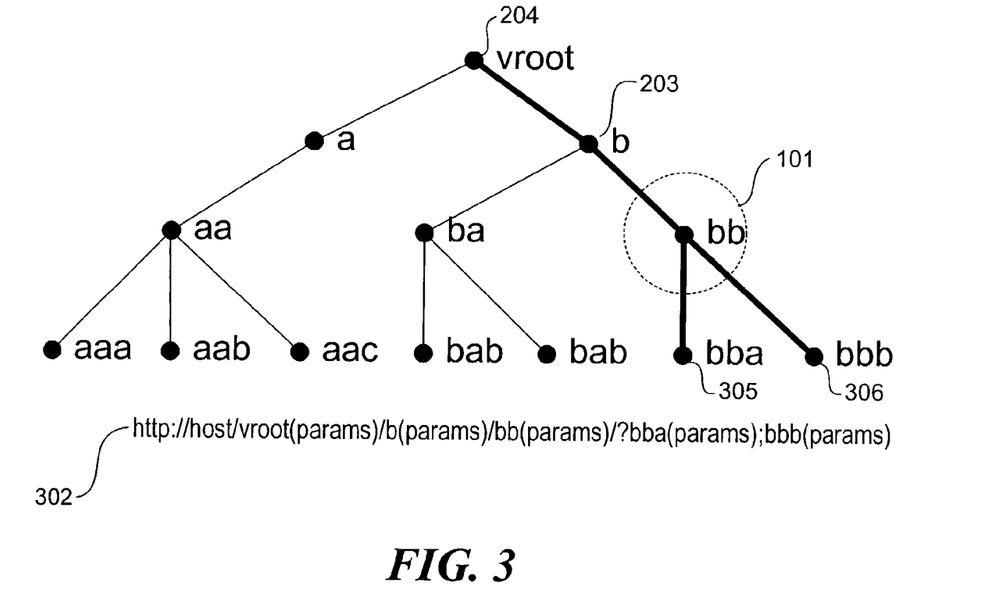
FIG. 3 includes a modified diagram of the resource tree of FIG. 2 and corresponding modified HTTP URL, illustrating a feature of the extended URI scheme that enables child resources of the current resource to be additionally used to service the request.

As depicted by a block 604 in the flowchart of FIG. 6, the next extension to the HTTP ULR semantic provides a mechanism for including resources that are direct or indirect children of the resource corresponding to the current client navigation state. For example, since nodes bba 305 and bbb 306 are direct children of the currently selected node bb 101, they are to be included in the modified HTTP URL, as shown in FIG. 3. As further shown in FIG. 3, in the modified HTTP URL 302, resource identification information and parameters pertaining to the child nodes of the currently selected node (e.g., nodes bba 305 and bbb 306 for currently selected node bb 101) are appended to the URL after the standard "?" parameter delimiter, thereby positioning this information in the query part of the URL. As a result, selected node bb 101 still remains current, and this mechanism for embedding the child resources and passing parameters to these resources meets the semantic requirements defined by the HTTP URL standard. Such an extension makes further assumptions about how the resources are arranged. Now all of the sub-resources of the current resource may further participate in request processing.

So far, the operations performed in blocks 600, 602, and 604 have enabled the number of individual resources participating in the request processing to be expanded. Now, a mechanism that does the opposite—limiting such a number—is invoked. As depicted by a block 606, the resources corresponding to direct children of a particular resource are arranged into one or more groups, such that each of the groups includes one or more sub-resources. In one embodiment, the group of sub-resources becomes a switch of resource sub-hierarchies, whereby only one of the sub-resources of a particular group participates in request handling. The value of the switch is the name of currently selected (active) sub-resource. Such a value can be presented in the path part of the URL, as shown in FIG. 4 (wherein in HTTP URL 402 the "bbb(params)" portion of HTTP URL 302 has been removed), or might belong to a parent resource state.

Figure 4:
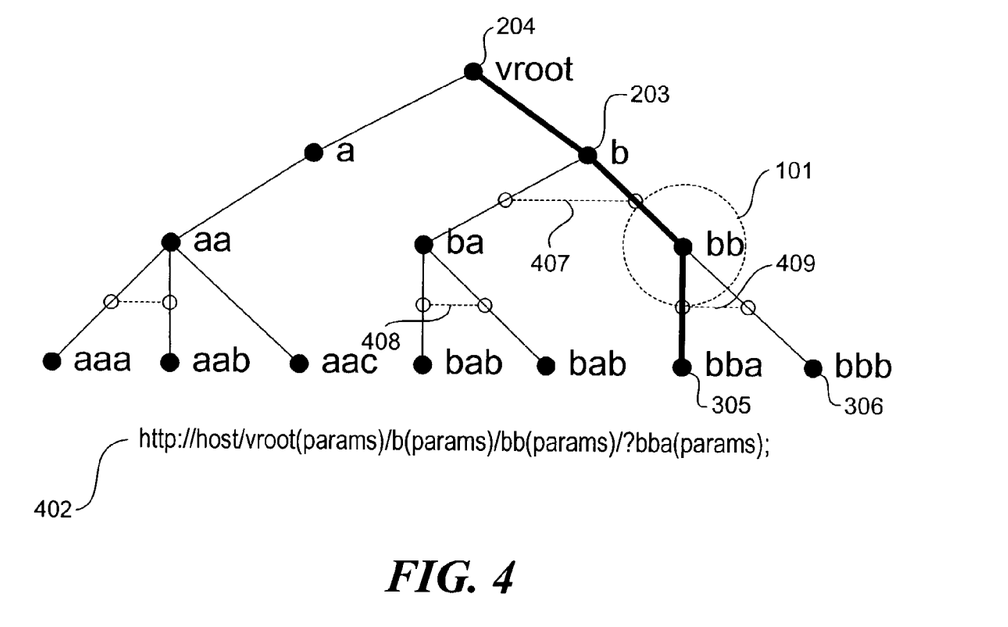
FIG. 4 includes a modified diagram of the resource tree of FIG. 3 and corresponding modified HTTP URL, wherein the resource tree and modified HTTP URL have been changed to further include switches between mutually exclusive elements.

In FIG. 4, the resource tree has been changed to further include the switches between mutually exclusive elements, wherein each switch is depicted as a horizontal dotted line (e.g., lines 407, 408, and 409) connected between the branches connecting a parent resource to its child resources. In the illustrated example, the node bbb 306 is de-selected, since it is in the same group with node bba 305, and node bba is referred to in HTTP URL 402.

Once the mechanism of mutually exclusive sub-resources limiting the resource engagement on a particular sub-tree has been introduced, it becomes possible to eliminate the notion of a current resource. The resource engagement now starts from the root of the tree and proceeds throughout the entire tree, except for the nodes excluded by the switches.

Figure 5:
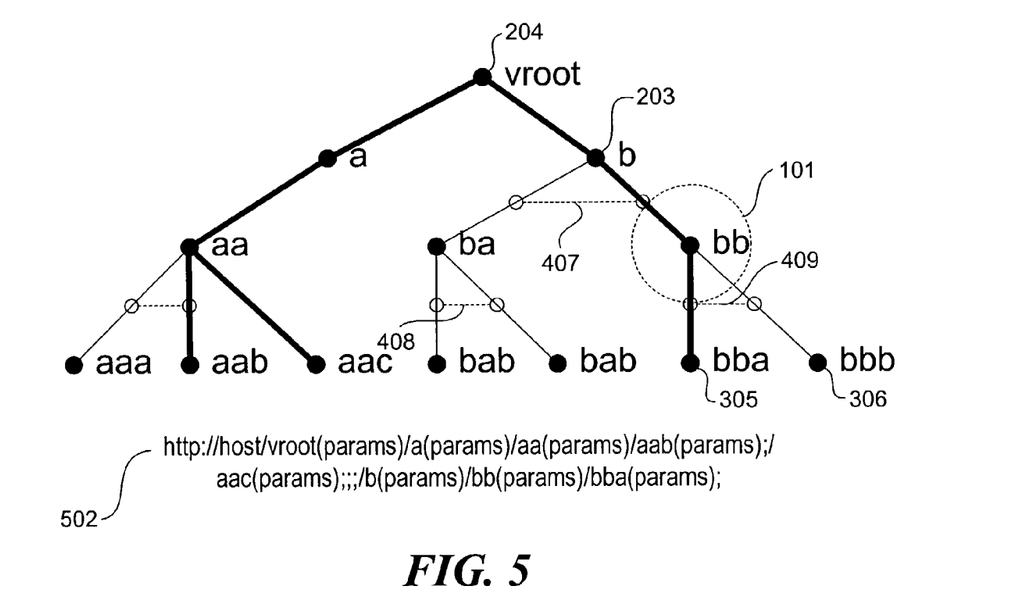
FIG. 5 includes a modified diagram of the resource tree of FIG. 4 and a corresponding modified HTTP URL, wherein the resource tree has been changed to reflect the concurrent inclusion of resources on multiple branches of the tree in the modified HTTP URL.

Since there is no current resource any longer, there is no need to use both the path and query parts of the URL, as shown by an HTTP URL 502 in FIG. 5. In this embodiment, the entire list of resources may reside in the path part of the ULR. Furthermore, the URL may specify resources on separate branches of the resource tree, as depicted by a block 608. This is enabled, in part, through parent resource referencing. To express the hierarchical structure in the path part, a reference to the parent ("; ") is introduced in addition to the commonly used reference to the child ("/"). A single "; " indicates a relative reference to a parent of a resource corresponding to a given node, a double ";;" indicates a relative reference to a grandparent resource of the resource, etc.

Similarly to parenthesis introduced earlier, a semicolon (";") is treated by existing HTTP URL schema implementations as a part of the path chunk. In accordance with applications that incorporate the teachings of the present invention, an Application Server interprets semicolons as it parses the path part of the URL to identify appropriate resources that may be used to service a request, as illustrated by HTTP URL 502 and the resource tree of FIG. 5.

Figure 7A:
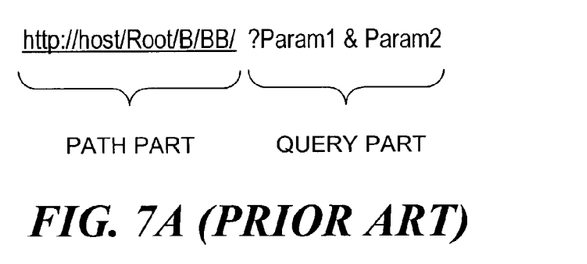
FIG. 7A illustrates the part and query parts of a conventional HTTP URL in which multiple parameters may be passed to a single resource specified by the path part.

FIG. 7A shows an example of a traditional HTTP URL in which multiple parameters may be passed to the resource specified by the path part of the URL. The parameters (functional state) are indicated by the "?" after the path part, which comprises the URL base and any applicable path relative to the base (the navigational state). When multiple parameters are used, they may be chained together by one or more "&".

Figure 7B:
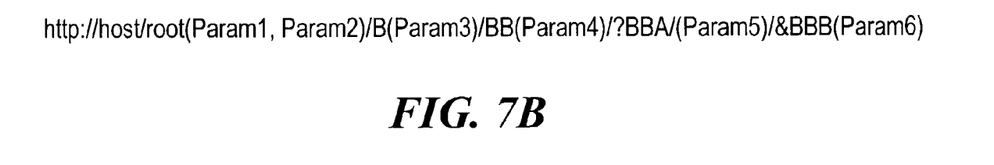
FIG. 7B is a modified HTTP URL in accordance with the extended URI scheme, illustrating how multiple parameters may be passed to selected resources.

FIG. 7B shows an example of a modified HTTP URL semantic in accordance with one embodiment of the invention in which multiple parameters may be passed to one or more resources. The structure of the semantic is essentially the same as that discussed above, with the addition of multiple parameters being defined by providing a corresponding list of parameters separated by commas within the parentheses following a particular resource.

Figure 8:
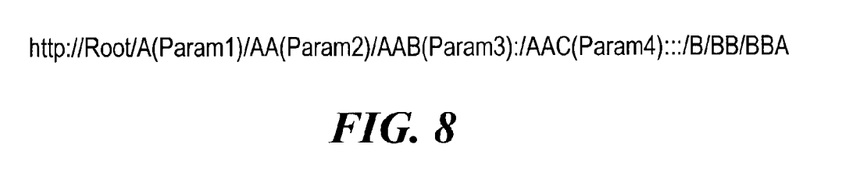
FIG. 8 illustrates another embodiment of an extended URI scheme that employs URI's that include a ":" as a parent reference.

In accordance with another aspect of the invention, a URI semantic is defined that enables multiple resources of an application resource tree to be accessed simultaneously in a manner similar to that described above. FIG. 8 shows an example of a URI 802 according to the extended semantic. At first look, it seems like a URL having a similar construction to the URLs described above. However further examination reveals the inclusion of ":" characters, which have been inserted in the string as "UP" operators, much like the "⌐" is used in graphical user interface (GUI)-based operating systems, such as Microsoft Windows™, to move up one directory level in a directory hierarchy. To maintain complete transparency with existing systems and subsystems, such as web browsers etc, an ":" is used, or in some cases, other, non-delimiting (unreserved) characters may be used, which are transparent for a space, such as "!", "-". etc.

By expressing the application navigation state in the form of a restricted tree, a system using URIs achieves (a) natural external reference-ability of internal application resources, eliminating the need for intermediate mapping, (b) separation of functional and data navigation states, and (c) separation of parameters of individual resources involved in request processing, de-risking name conflicts and increasing usability. Importantly, the separation of functional and data navigation state and separation of parameters enables client navigation states to be independent of application navigation states. For example, under a typical web scenario, such as a travel site, the user enters data via a set of separately-served web pages in a predetermined order. Furthermore, the client and application states are a synchronized such that the client entry and exit states are fixed. Accordingly, if the user needs to make a change on any earlier page, the user must not only go back to that page to make the change, but also must re-enter or enter new data on the pages following the page.

In contrast, by separating these states, the web application may allow the user to make the change via a change in the client navigation state without requiring a corresponding change in the application navigation state. This enables the user to make the change, and then continue where he or she was before, eliminating the need to re-enter data on the pages in between.

Other changes can be made without departing from the spirit of the invention. For example, a specific number of parameter may be only allowed, or required, rather than an open approach, but all will be novel in that with a single URI multiple resources can be accessed in one swoop, and each with its own parameters.

Two-Phase EXtensible Stylesheet Language Transformation (XSLT)

Figure 9:
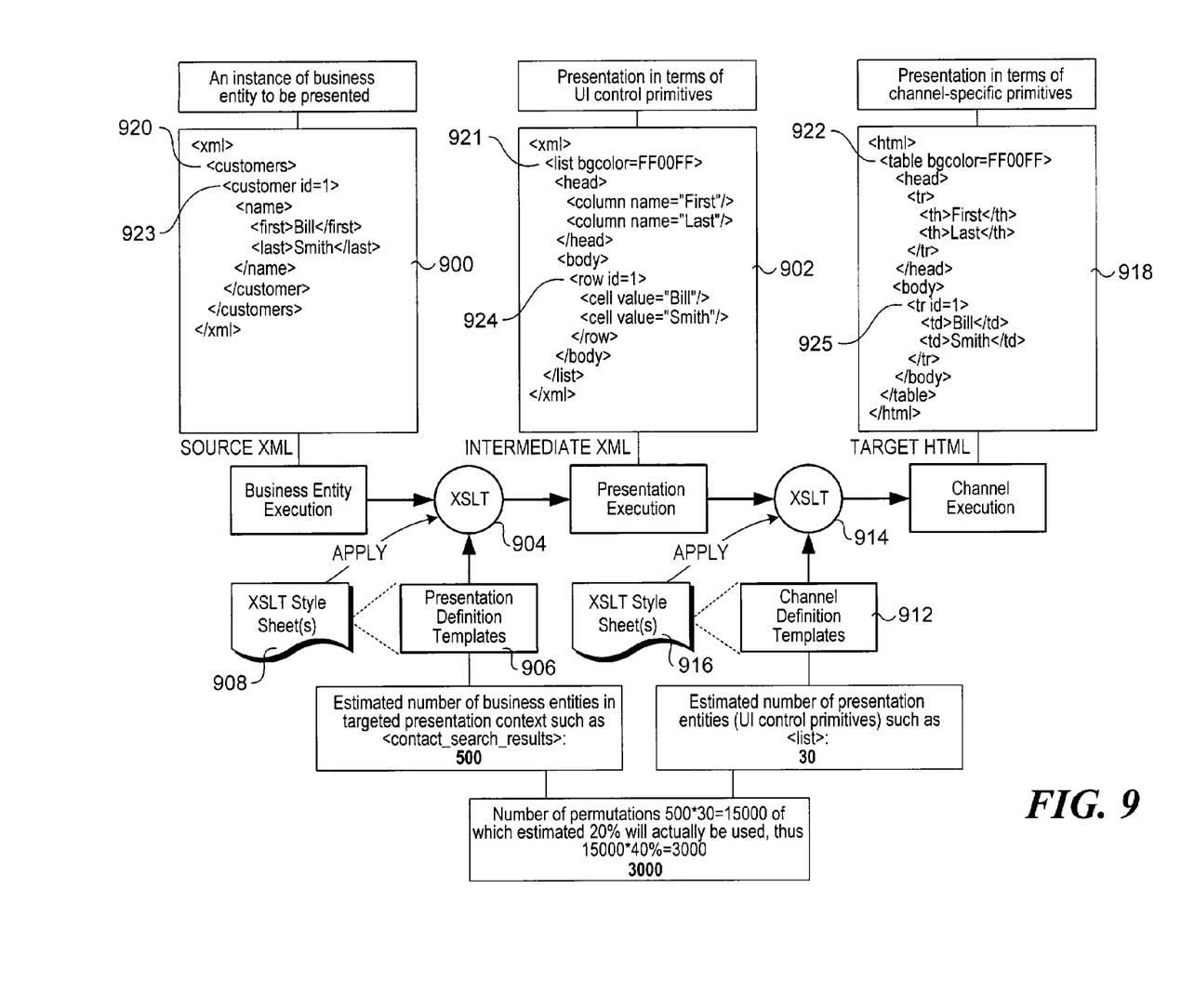
FIG. 9 is a combined schematic drawing and flow diagram illustrating operations performed during a two-phase XSLT transformation process in accordance with one embodiment of the invention.

The novel approach of the present invention for eXtensible Stylesheet Language Transformation (XSLT) recognizes two semantically distinct phases of the transformation process. The approach introduces XML (eXtensible Markup Language) primitives—commonly reused parts of the presentation—and XSL primitives—reusable transformation instructions for such XML primitives. The first phase of the transformation translates source XML, which, like in a traditional approach, could be arbitrary business data contained in a block of XML, into intermediate XML, which is pre-determined by its structure and is expressed in the form of such XML primitives. The second phase of the transformation translates intermediate XML into a channel-specific target language, such as HTML. FIG. 9 depicts the basics operations of the two-phase transformation approach.

As the name implies, XSLT is an XML-based language used to create style sheets that are used to transform XML documents into other types of documents and to format the output of XML documents. XSLT became a W3C Recommendation in November, 1999; the specification can be found at http://www.w3.org/TR.xslt. XSLT style sheets are built on structures called templates. A template specifies what to look for in an input document, called the source tree, and what to put into an output document, called the result tree. The templates and other portions of an XSLT style sheets are composed of XSLT elements, which generally include the <xls:style sheet>, <xls:template>, <xsl:value-of:>, <xls:output>, <xls:element>, <xls:attribute>, <xls:attribute-set> and <xsl:text> elements. The XSLT elements also include conditional elements, such as <xsl:if>, <xsl:choose>, elements and loop elements such as the <xsl:for-each> element. All of these elements will be familiar to those skilled in the XSL art.

During the first transformation phase, XML in its source form (the first source tree) is translated into an intermediate form (the first result tree) using translation specifications contained in a set of presentation definition XSLT templates. For example, in the operations depicted in FIG. 9 a source XML block 900 is transformed into an intermediate XML block 902 via a first-phase XSLT process 904 through application of a set of presentation definition XSLT templates 906 contained in one or more XSLT style sheets 908. The presentation definition XSLT templates contain translation definitions to translate originally-formatted source XML into an intermediate XML format comprising XML elements corresponding to a set of "UI (user-interface) control primitives." In one embodiment, a respective presentation definition XSLT template is defined for each XML business entity that may be used by one or more given applications, wherein each block of the resulting intermediate XML comprises XML elements corresponding to one or more UI control primitives.

During run-time, appropriate presentation definition XSLT templates 906 are applied during the first transformation phase to the source XML based on the business entities present in the source XML, wherein the appropriate templates are identified based on a business entity-to-template mapping defined by the XSL code in XSLT style sheet(s) 908. Such mappings may be conveniently implemented via well-known XSL programming techniques, as will be recognized by those skilled in the XSL art. For example, in accordance with the illustrated example in which source XML block 900 contains a source XML tag <customers> 910, logic will be defined in XSLT style sheet(s) 908 that will cause a template in the style sheet to be invoked whenever a <customers> tag is encountered while processing the source XML.

During the second transformation phase, the intermediate XML content is transformed into content comprising channel-specific primitives using a second set of "channel definition" XSLT templates 912 during a second-phase XSLT process 914. These channel-specific primitives are used to build the client-side user-interface, which may be a graphical user interface (GUI), or another type of user interface, such as a verbal user interface employed in a voice-access system or a wireless device user interface. Accordingly, since the UT control primitive are used in building the client user interface, the UI control primitives should selected such that they may be transformed into corresponding channel-specific primitives corresponding to the type of user-interface generated at the client.

For example, in accordance with the illustrated embodiment of FIG. 9, the client-side UI is to be generated by rendering HTML content. Thus, each primitive in the set of UI control primitives should be selected (or otherwise defined) such that it may be transformed into one or more HTML primitives (i.e., HTML tags). In a manner similar to that used to facilitate the first transformation phase, respective channel definition XSLT templates 912 are defined for each UI control primitive XML element, wherein each template contains translation definitions for translating the XML element into one or more corresponding HTML primitives (i.e., HTML tags). The second phase transformation is further facilitated by defining logic in XSLT style sheets 916 (in which channel definition templates 912 are contained) that map each UI control primitives (XML element) to the corresponding template that contains the translation definition for that UI control primitive. During run-time, appropriate channel definition XSLT templates are applied during the second transformation phase based on the UI control primitives present in the intermediate XML and the UI control primitive-to-template mapping defined in XSLT style sheet(s) 916. In the case of an HTML client, after both phases of the two-phase XSLT transformation process have been completed, the (second) result tree will comprise target HTML content that is used to render a graphical UI on the client, such as that depicted by an HTML block 918.

Under the foregoing two-phase XSLT transformation scheme, the example provided earlier in the background section is implemented as follows: Source XML tag <customers> 920 is translated into an intermediate XML tag <list> 921, and is then translated into a target HTML tag <table> 922; similarly, source tag <customer> 923 is translated into an intermediate tag <row> 924, and then is translated into a target HTML tag <tr> 925. Each of these translations is defined in a corresponding XSLT template(s)

that is/are invoked during the execution of the first and second phase XSLT transformations.

As discussed above, the intermediate XML comprises a set of UI control primitives comprising corresponding XML elements. The idea here is to employ a relatively small set of presentation definition XSLT templates to transform source XML that may be derived from a much larger set of XML business entities into appropriate an intermediate XML form comprising the set of UI control primitives. A somewhat similar paradigm is implemented during the second phase of the transformation, wherein the UI control primitives (XML elements) are transformed into channel-specific primitives (e.g., HTML, WML or VXML elements). For example, for HTML clients, the intermediate XML content is transformed into HTML content using a set of XSLT templates that define respective UI control primitive-to-HTML element translations.

Suppose that the source XML corresponding to a different page (not shown) contains a source tag <orders> containing data content that may also be translated into a list containing multiple rows. Through implementation of (an) appropriately-defined presentation definition XSLT template(s), the source tag <orders> may be translated into the same UI control primitive (intermediate XML tag <list> 911) as above (of course, the data content of the tag will be different); likewise, a source tag <order> (akin to source tag <customer> 913) may be translated to an intermediate XML tag <row> 914. Thus, UI control primitives comprising intermediate XML tags <list> 911 and <row> 914 could be used for both pages.

In addition to business entity-to-UI control primitive translations, the XSLT templates may also be used to control various UI attributes, such as display color and formatting attributes. For example, XSLT template code corresponding to specific rendering attributes, such as the background color for a list, may also be included in the XSL of the first phase of the transformation and, therefore, appear in the intermediate XML as data (e.g., the "bgcolor=FF00FF" data contained in intermediate XML tag <list> 921).

While the first part of the transformation works with arbitrary source XML and corresponding XSL, the second part of the transformation works with the XML of a pre-determined static structure (i.e., an XML schema comprising a pre-defined set of UI control primitives) and constant XSL. Thus, significant parts of the transformation become reusable.

The two-phase transformation is conceptually similar to the idea of GUI control primitives, implemented in major graphical user interface libraries available for traditional, "fat" clients. HTML, by itself, provides a number of primitives, and, therefore, is the library; however, unlike traditional graphical user interface libraries, it is rather limited and not directly extendable in respect to the primitives it offers. Two-phase transformation provides a way to create extendable user interface primitives' libraries, similar in usability and expressive power to the best traditional, "fat" client libraries, yet HTML compliant.

Similarly to traditional XSL transformation, the two-phase transformation could be performed at either the server or client side. Unlike the traditional approach, the two-phase transformation could be split between the server and client—the first phase could be done on the server, and the second, on the client. Splitting the transformation ensures that XML sent to the client is compliant with the static XML schema, and that XSL content required to transform such XML is constant. During design-time, a static XML schema would help validate the output produced by the application.

At run-time, a static XML schema enables caching of XSL on the client in the form of a file, or better yet, as a pre-parsed and precompiled presentation of XSL in the client's memory.

If both phases of transformation are to be run on the same side (server or client), then both phases can be performed with the same invocation of the transformation engine, due to the fact that the XSL for both phases can be cascaded—a feature of XSL. As an implementation option, the transformation engine might not be used for the first phase at all; in this case, the application would generate the XML as required for the second phase.

The overall number of UI control primitives required to address the majority of requirements of advanced web-enabled applications is estimated to be at around 30. The number of business entities of such an application that require presentation is estimated to be around 500. Assuming that only 20 percent of permutations of business entities and UI primitives would actually be used in the application, one would arrive at (500*30)*20%=3000 XSL templates required for the implementation of such an application with a traditional XSL transformation approach. With the novel two-phase transformation approach of the present invention, however, the total number of required templates would be only 500+30=530.

If multiple applications are built, the 30 templates for phase two can be reused from application to application, bringing the number of application-specific templates down to 500—six times fewer than the traditional approach would require. Furthermore, the reusability of the second phase templates would promote the same look and feel as well as greatly simplify change control, both within an application and across multiple applications. Additionally, it is important to emphasize that the proposed novel two-phase transformation approach could be leveraged in non-HTML graphical or non-graphical presentation channels, such as an interactive voice response channel. In general, XSL transformations may be used to transform content from a first markup language form (e.g., XML) to either a second form using the first markup language or to a second form comprising a second markup language. Accordingly, the intermediate XML may be transformed into other markup languages in additional to HTML, such as WML (wireless markup language) and VXML (voice extended markup language).

Finally, two-phase transformation might promote a certain degree of channel-independence of the applications. Also, in active server page implementations, a two-step XSLT process (TPXSLT, 2PXSLT) corresponding to the first phase may be used for pre-processing certain aspects for each customer, wherein the second phase would be employed to do an overall run. In a practical example, a company doing billing for two different phone companies may first run the data through a company-specific template, then through a phone billing recipient template (which may be the same for both phone companies).

Exemplary File Server Computer System

Figure 10:
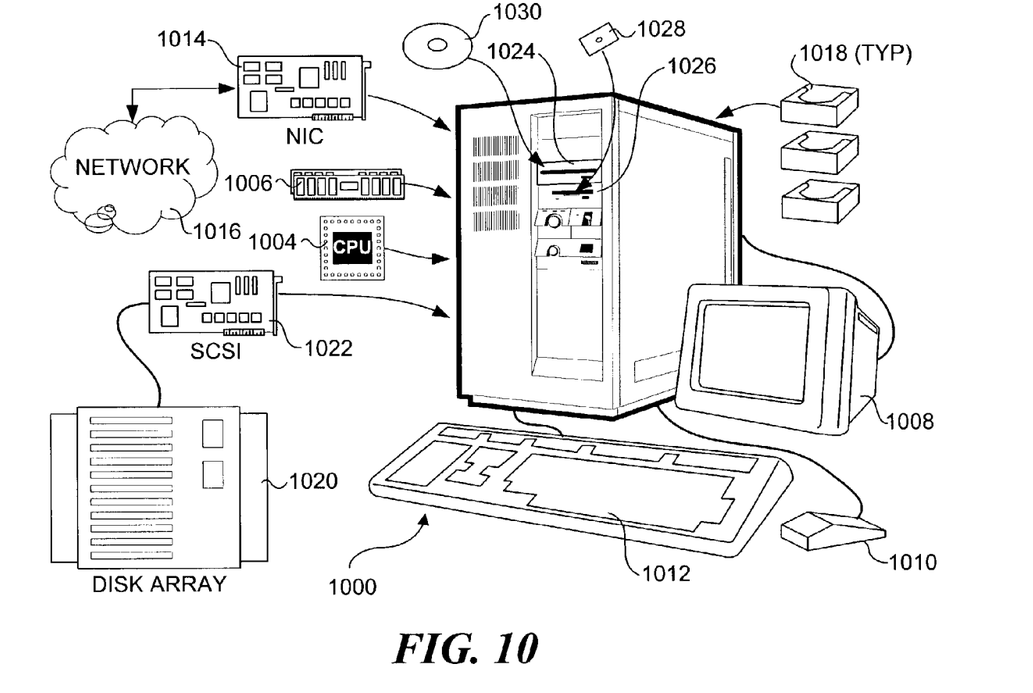
FIG. 10 is a schematic drawing of an exemplary computer server system that may be used to implement aspects of the embodiments of the invention disclosed herein.

With reference to FIG. 10, a generally conventional computer server 1000 is illustrated, which is suitable for use in connection with practicing the present invention. Examples of computer systems that may be suitable for these purposes include stand-alone and enterprise-class servers operating UNIX-based and LINUX-based operating systems.

Computer server 1000 includes a chassis 1002 in which is mounted a motherboard (not shown) populated with appropriate integrated circuits, including one or more processors 1004 and memory (e.g., DIMMs or SIMMs) 1006, as is generally well known to those of ordinary skill in the art. A monitor 1008 is included for displaying graphics and text generated by software programs and program modules that are run by the computer server. A mouse 1010 (or other pointing device) may be connected to a serial port (or to a bus port or USB port) on the rear of chassis 1002, and signals from mouse 1010 are conveyed to the motherboard to control a cursor on the display and to select text, menu options, and graphic components displayed on monitor 1008 by software programs and modules executing on the computer. In addition, a keyboard 1012 is coupled to the motherboard for user entry of text and commands that affect the running of software programs executing on the computer. Computer server 1000 also includes a network interface card (NIC) 1014, or equivalent circuitry built into the motherboard to enable the server to send and receive data via a network 1016.

File system storage corresponding may be implemented via one or more hard disks 1018 that are stored internally within chassis 1002, and/or via a plurality of hard disks that are stored in an external disk array 1020 that may be accessed via a SCSI card 1022 or equivalent SCSI circuitry built into the motherboard. Optionally, disk array 1020 may be accessed using a Fibre Channel link using an appropriate Fibre Channel interface card (not shown) or built-in circuitry.

Computer server 1000 generally may include a compact disk-read only memory (CD-ROM) drive 1024 into which a CD-ROM disk may be inserted so that executable files and data on the disk can be read for transfer into memory 1006 and/or into storage on hard disk 1018. Similarly, a floppy drive 1026 may be provided for such purposes. Other mass memory storage devices such as an optical recorded medium or DVD drive may also be included. The instructions comprising the software program and/or modules that cause processor(s) 1004 to implement the operations of the present invention that have been discussed above will typically be distributed on floppy disks 1028 or CD-ROMs 230 (or other memory media) and stored in one or more hard disks 1018 until loaded into memory 1006 for execution by processor(s) 1004. Optionally, the instructions may be contained in a carrier wave file that is loaded via network 1016.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer implemented method comprising:
   receiving a uniform resource locator (URL) string corresponding to a Hyper Text Transfer Protocol (HTTP) request, the URL string including a uniform resource identifier (URI) string constructed according to an extended uniform resource identifier (URI) scheme to identify a plurality of resources via resource identification information embedded in the URI string, the URI string including parameters to be passed to respective resources among the plurality of resources, the parameters and the resource identification information being specified in a path portion of the URI string, the path portion including an intermediate node specifying a name of one resource and one or more parameters to be passed to the resource identified by the name, the URI string being compatible in syntax with a Hyper Text Transfer Protocol (HTTP) uniform resource locator (URL) schema;
   parsing the URI string based on a set of predefined parsing rules to extract the resource identification information and the parameters according to the extended URI scheme; and
   servicing the request via independently using the plurality of resources specified by the extracted resource identification information with corresponding parameters extracted from the URI string.

2. The method of claim 1, wherein the intermediate node is between two adjacent forward slashes in the path portion; the intermediate node includes a plurality of parameters to be passed to the resource identified by the name specified in the intermediate node; and the plurality of parameters are specified within parenthesis and separated by comma.

3. The method of claim 1, wherein the plurality of resources identified by the URI string comprise a tree of resources; the tree comprises a plurality of branches; and the URI string includes a plurality of occurrences of a symbol which is used to indicate moving back up a directory level.

4. The method of claim 1, wherein the plurality of resources identified by the URL string comprise a tree of resources; and the tree comprises more than one leaf node.

5. A computer implemented method comprising:
   identifying a plurality of independent resources that define a current navigation state of an application;
   building a modified uniform resource identifier (URI) based on a predefined extended URI scheme, said modified URI containing resource identification information to identify the plurality of resources and parameters to be passed to respective resources among the plurality of resources, the modified URI being compatible in syntax with a Hyper Text Transfer Protocol (HTTP) uniform resource locator (URL) schema, the modified URI including a segment corresponding to a directory name according to a Hyper Text Transfer Protocol (HTTP) uniform resource locator (URL) schema, the segment including a name and one or more parameters to be passed to the resource identified by the name; and
   serving the modified URI to a client.

6. The method of claim 5, wherein a query portion of the URI includes multiple resource identifiers specifying multiple independent resources among the plurality of resources.

7. The method of claim 5, wherein the extended URI scheme enables the modified URI to reflect a client navigation state that is independent of an application navigation state corresponding to an application that is used to service the client.

8. The method of claim 5, wherein the resources available to the application are configured in a resource tree and a current client navigation state corresponds to a node in the resource tree, and wherein the modified URI includes information identifying the current client navigation state and multiple resources along a resource tree path to the node corresponding to the current client navigation state, said multiple resources being used to service a request corresponding to the current client navigation state.

9. The method of claim 8, further wherein the modified URI enables parameters to be passed to each of the multiple resources.

10. The method of claim 8, wherein the modified URI further includes information identifying at least one additional resource comprising a child resource of a resource corresponding to the current client navigation state.

11. The method of claim 10, wherein the modified URI further enables parameters to be passed to said at least child resource.

12. The method of claim 8, wherein the modified URI may further include information identifying resources that are on a separate branch of the resource tree than the branch on which the node corresponding to the current client navigation state resides.

13. The method of claim 8, wherein the modified URI further enables parameters to be passed to the resources on the separate branch of the resource tree.

14. A memory media having stored thereon a set of instructions which when executed perform a method comprising:
  identifying a plurality of independent resources that define a current navigation state of an application;
  building a modified uniform resource identifier (URI) based on a predefined extended URI scheme, said modified URI containing resource identification information to identify the plurality of resources and parameters to be passed to respective resources among the plurality of resources, the modified URI being compatible in syntax with a Hyper Text Transfer Protocol (HTTP) uniform resource locator (URL) schema, the modified URI including a segment corresponding to a directory name according to a Hyper Text Transfer Protocol (HTTP) uniform resource locator (URL) schema, the segment including a name and one or more parameters to be passed to the resource identified by the name; and
  serving the modified URI to a client.

15. The memory media of claim 14, wherein resource identifiers corresponding to a second portion of the plurality of resources are embedded in a query portion of the URL.

16. The memory media of claim 14, wherein the extended URI scheme enables the modified URI to reflect a client navigation state that is independent of an application navigation state corresponding to an application that is used to service the client.

17. The memory media of claim 14, wherein the resources available to the application are configured in a resource tree and a current client navigation state corresponds to a node in the resource tree, and wherein the modified URI includes information identifying the current client navigation state and multiple resources along a resource tree path to the node corresponding to the current client navigation state, said multiple resources being used to service a request corresponding to the current client navigation state.

18. The memory media of claim 17, further wherein the modified-URI enables parameters to be passed to each of the multiple resources.

19. The memory media of claim 17, wherein the modified URI further includes information identifying at least one additional resource comprising a child resource of a resource corresponding to the current client navigation state.

20. The memory media of claim 19, wherein the modified URI further enables parameters to be passed to said at least child resource.

* * * * *